United States Patent [19]

Tomita

[11] Patent Number: 4,587,947
[45] Date of Patent: May 13, 1986

[54] COMPACT PORTABLE GRILL APPARATUS

[76] Inventor: Rioe Tomita, P.O. Box 1321, Kaneohe, Hi. 96744

[21] Appl. No.: 629,564

[22] Filed: Jul. 10, 1984

[51] Int. Cl.⁴ ............................................. F24B 3/00
[52] U.S. Cl. .................................. 126/25 R; 126/9 R
[58] Field of Search ............... 126/25 R, 25 A, 25 B, 126/9 R

[56] References Cited

U.S. PATENT DOCUMENTS

| | | | |
|---|---|---|---|
| 501,918 | 7/1893 | Caldwell | 285/404 |
| 604,342 | 5/1898 | Weber et al. | 126/25 R |
| 653,384 | 7/1900 | Grove | 285/404 |
| 974,290 | 11/1910 | Merritt | 126/77 |
| 3,915,144 | 10/1975 | Tomita | 126/25 B |
| 4,413,609 | 11/1983 | Tisdale | 126/25 R |

*Primary Examiner*—Carroll B. Dority, Jr.
*Attorney, Agent, or Firm*—James C. Wray

[57] ABSTRACT

A compact portable grill has upper and lower sections of a base, a grill body and a cover which may also be used as a cooking pot or wok. The cover, grill body, upper section and lower section, are all of equal height. When the cover and upper section are inverted, the grill body fits within the cover, the upper section of the base fits within the grill body and the lower section of the base fits within the upper section of the base in a compact, tight arrangement suitable for shipping or transporting in a short cardboard box. The lower section of the base and a lower portion of the grill body may hold a grate for roasting or grilling. In the former configuration, fuel is added through a sliding door in the upper section of the base. Paper is added and lighted through a door in a lower section of the base to start the briquets. Aligned openings in telescopic joints are held together by eye-bolts. Ventilation openings are closed by tightening flaps, which are extended above the grill body to hold a grill at various heights.

4 Claims, 19 Drawing Figures

COMPACT PORTABLE GRILL APPARATUS

BACKGROUND OF THE INVENTION

The invention concerns grill apparatus and, especially, portable grill apparatus used for outdoor cooking.

The inventor is the owner of U.S. Pat. Nos. 3,841,299, 3,915,144 and 3,915,145, which describe outdoor grills. The disclosure of those patents is incorporated herein by reference.

SUMMARY OF THE INVENTION

The present invention provides a compact portable outdoor grill. A base body has a lower end and an upper end. Means at the upper end of the base body receive a grill body A grill body has an upper end and a lower end, and means at the lower end of the grill body connect to an upper end of the base body. The base body has lower and upper sections. The lower section of the base body has a floor at a lower end thereof and has an open upper end. Means at the upper end of the lower section of the base body receive a lower end of the upper section. The lower end of the upper section of the base body connects to the upper end of the lower section of the base body. The upper and lower sections of the base body have telescoping shapes so that, when the upper section of the base body is removed and inverted, one of the base body sections fits within the other base body section. The upper and lower sections and the grill body have substantially identical heights so that the upper and lower sections fit within the grill body in uniform height when in a shipping carton.

The preferred grill body has grate receiving means positioned within the grill body and spaced slightly upward from a lower end thereof. A grate means is positioned within the grate receiving means.

Preferably, the lower section of the base body of the grill has grate receiving means positioned within an upper end thereof, whereby the grate may be interchangeably mounted on the lower section of the base body and on the grill body.

The preferred grill has a cover having an open lower end for attaching to an upper end of the grill body and having a closed upper end. The upper end of the cover is larger than the lower end of the grill body, and the cover has a height similar to the height of the grill body so the cover may be inverted with the grill body. An inverted upper section and lower section of the base body telescope for shipping. The upper end of the cover is smaller than the middle of the grill body, so the cover may be inverted with its normally upper end placed in the grill body for cooking food within the inverted cover.

In the preferred embodiment, the grill has complementary openings radially extending through walls of the upper and lower sections near the upper end of the lower section and the lower end of the upper section. It also has fasteners for selectively inserting through aligned complementary openings and withdrawing from aligned complementary openings for selectively holding the lower body assembled and permitting disassembly of the lower body. In addition, it has radially extending vertically elongated guide means in walls of the upper and lower sections for aligning the sections and complementary openings therein when assembling the sections.

Preferably, the grill has a ventilation opening in a wall of one of the base body sections and the grill body, flap means associated with the ventilation opening for selectively opening and closing the ventilation opening and connecting means connected to the flap means and to the wall for selectively drawing the flap means against the wall and closing the ventilation opening with the flap means and selectively permitting the flap means to move away from the wall to open the ventilation opening.

In the preferred embodiment, the connection means of the grill has holes extending through the wall of the body and through the flap means and turntable means connected to the fastener means for tightening the fastener means and drawing the flap against the body and against the ventilation opening.

Preferably, the ventilation holes of the grill are provided in an upper portion of the grill body and in the lower section of the base body.

In the preferred embodiment, the flap means connected to the grill body has extensions extending outward and upward from the flap means. The extensions have upper portions with plural inward extending grooves for selectively receiving the grill in varied positions above the grill body, so that, when the upper ventilation openings are closed by the flap means by the fasteners drawing the flap means tight against the grill body, the upward extensions may be used to selectively position the grill above the grill body.

The preferred embodiment of the grill has upper telescoping means on an upper end of the upper section of the base body and complementary lower telescoping means on the lower end of the grill body. It also has handle means positioned adjacent the telescoping means and complementary openings extending through the handle means and the telescoping means for joining the handle means, the telescoping means, the grill body and the upper section of the base body.

Preferably, the grill has upper and lower rectangular lateral openings respectively in the upper and lower sections of the base body, upper and lower frame means respectively surrounding the upper and lower openings and upper and lower doors respectively mounted in the upper and lower frame means.

In the preferred embodiment, the grill body has a relatively large upper end and a relatively small lower end. It has walls connecting the upper and lower ends, both lower and upper ends being open. It has a telescoping collar at the lower end for receiving a complementary telescoping collar on an upper end of the upper section of the base body. The upper end of the grill body has a vertically downward extending wall portion and a horizontally inward extending wall portion for receiving the grill. The grill has grate receiving means inwardly extending from a wall of the body above the lower end thereof for receiving and holding a grate suspended above the lower end of the grill body.

In a preferred embodiment, the lower section of the base body has at a lower end thereof a bottom with an opening in the bottom, a frame connected to the bottom for surrounding the opening and a sliding door connected to the frame for selectively closing the opening and opening the opening to permit ash to fall through the opening at the lower end of the lower section of the base body.

Preferably, the grill has legs connected to the frame for supporting the frame and for supporting the lower section on the frame and the legs.

BRIEF DESCRIPTION OF THE DRAWINGS

FIG. 4 is a detail of a base of the stove of the present invention.

DETAILED DESCRIPTION OF THE DRAWINGS

Figure 1:
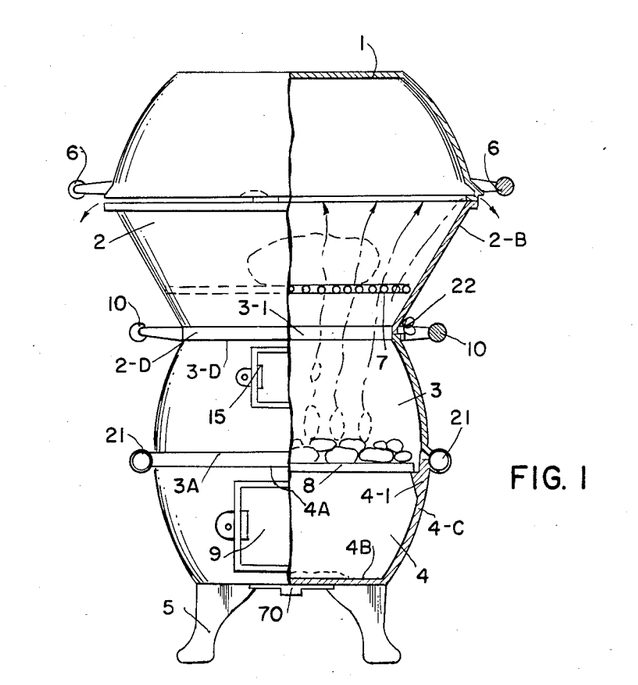
FIG. 1 is an elevation partially in section of a stove of the present invention.

The stove apparatus shown in FIG. 1 has a cover 1 which fits on the upper surface of a grill body portion 2 of the stove. The grill body 2 is connected to the open upper end of the upper section 3 of the stove body. The lower open end of the stove upper section 3 is connected to the open upper end of the lower stove body section 4, which rests on legs 5.

Handles 6 are connected to the cover 1 near the lower edge of the cover. Rotating the cover with respect to the stove body slightly lifts the cover from the stove body to permit a draft, as shown by the arrows. A grill 7 for roasting may be placed upon the supports 2-1 in the grill body. Grates 8 may be placed on the supports 4-1 in the lower stove base body section 4 when the stove is used in the roasting mode. When the stove is used for grilling, the grate 8 may be supported on the grate supports 2-1 in the grill body. In either configuration, charcoal upon the grate 8, either in the lower position, as shown in the drawing, or in the upper position, is ignited by inserting and igniting newspapers through door 9. Handles 10 are connected to the upper stove body and to the grill body by extending fasteners through the upper flange 3-1 of the stove body section 3 and through the complementary, telescoping inner flange of the grill body 2. Fasteners 21 are inserted through telescoping portions 3A and 4A of the upper and lower stove body sections 3 and 4 respectively to secure the sections together. The lower body section has a spheroidal side wall 4C and a generally flat floor 4B, which is connected to and rests upon the leg assembly 5, as will be described.

The grill body 2 has a generally conical wall 2B with a lower open portion 2D which telescopically interfits with the upper portion 3D of the upper section 3 of the stove body. Door 15 in the upper portion of the stove body may be opened when igniting the paper inserted through door 9 to encourage the starting of the paper. Fuel briquets may be added through door 15 when the grate 8 is in the lower position, as shown in FIG. 1. A sliding ash-removal door 70 is provided in the leg assembly, as will later be described.

Figure 2:
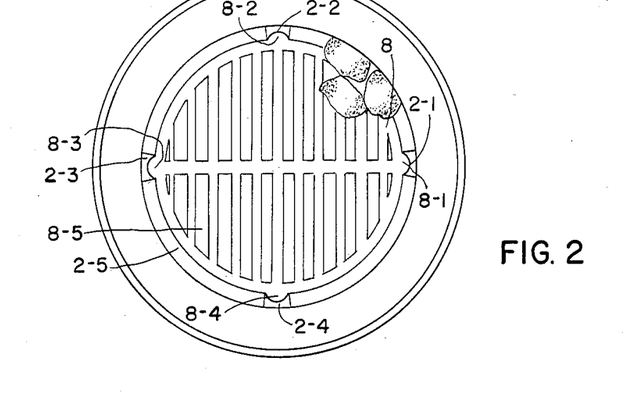
FIG. 2 is a plan view of a stove showing the grill body and charcoal briquets on the grate.

As shown in FIG. 2, when the grate 8 is placed in the upper position, radially extending lugs 8-1, 8-2, 8-3 and 8-4 rest upon inward extending supports 2-1, 2-2, 2-3 and 2-4 of the briquets on grate 8 through peripheral opening 2-5 through grill body. Combustion-supporting air is supplied to the grate openings 8-5.

Figure 3:
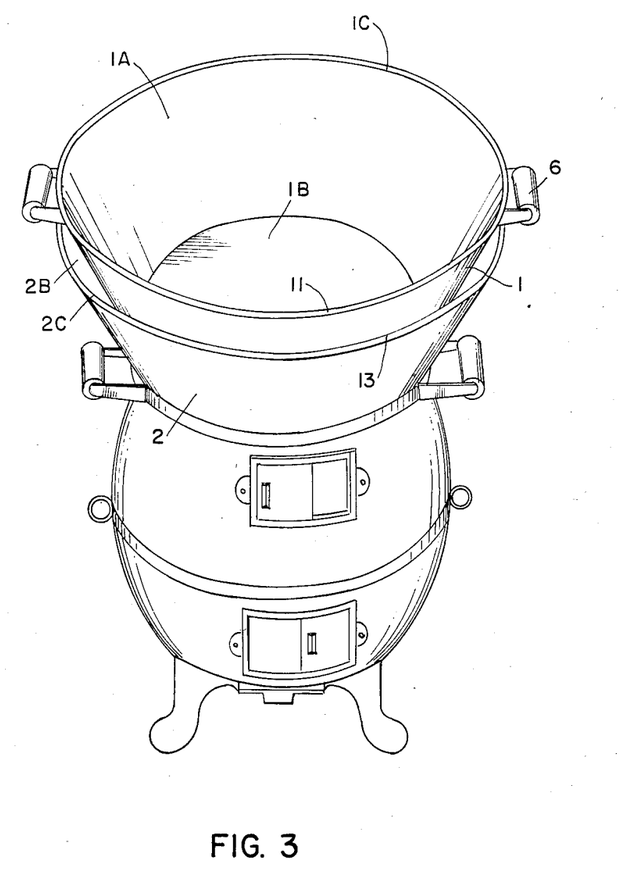
FIG. 3 is a perspective view of the stove of the present invention.

As shown in FIG. 3, the inverted cover has a spheroidal side surface 1A and a generally flat closed end 1B which may rest upon the charcoal briquets on grate 8 without extinguishing the briquets. An open end 1C of the cover rests upon upper edge 2C of the grill body when the wok shown in FIG. 3 is inverted and used as a cover. Recesses 11 and 12 in the edge 1C of the cover cooperate with lugs 13 on the upper edge 2C of the stove body to permit the cover and stove body to be misaligned for purposes of increasing exhaust draft.

As shown in FIG. 4, the leg assembly 5 has a flat upper surface and four dependent legs 5-2. Notches 61 and 62 receive a sliding plate 70 which selectively closes a central rectangular opening in the leg assembly plate. Openings 44, 45, 46, and 47 extend through the leg assembly to receive fasteners. Upward extending knobs 5-3, 5-4, 5-5 and 5-6 fit in corresponding holes in the lower stove body section.

Figure 5:
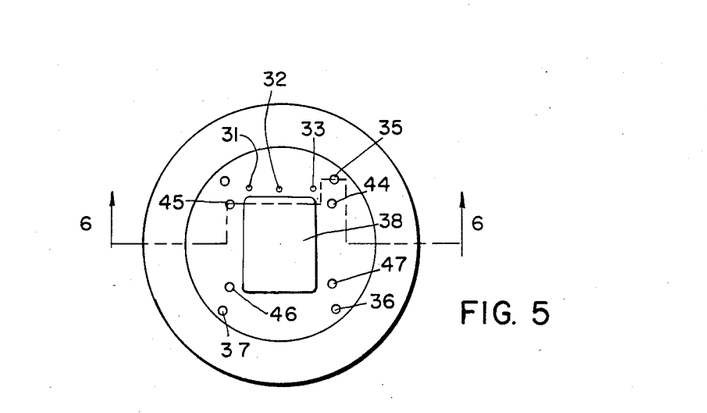
FIG. 5 is a plan view of a lower section of a stove body used with a base as shown in FIG. 4.
Figure 6:
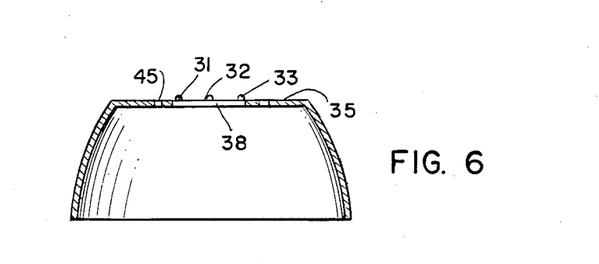
FIG. 6 is an inverted elevation in section showing the lower stove body of FIG. 6.

As shown in FIG. 5, the lower stove body section has a central opening 38 through which ashes may fall when door 70 is open. Openings 44', 45', 46' and 47' receive fasteners to connect the leg assembly to the lower stove body section. Holes 34, 35, 36 and 37 receive the lugs 5-3 . . . 5-6 in the leg assembly.

Downward extending knobs 31, 32 and 33 present a barrier to overtravel of the door 70 in the closing direction.

Figure 7:
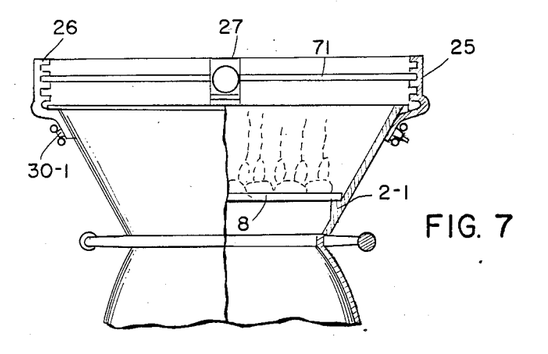
FIG. 7 is a detail of the grill body, grill and supports of the stove of the present invention.

As shown in FIG. 7, when the grate 8 is positioned on grate supports 2-1 in the grill body 2, the grill 71 may be supported in openings of grill supports 25, 26 and 27. The grill supports are connected to the upper portion of the grill body by fasteners with wing nuts 30-1.

Figure 8:
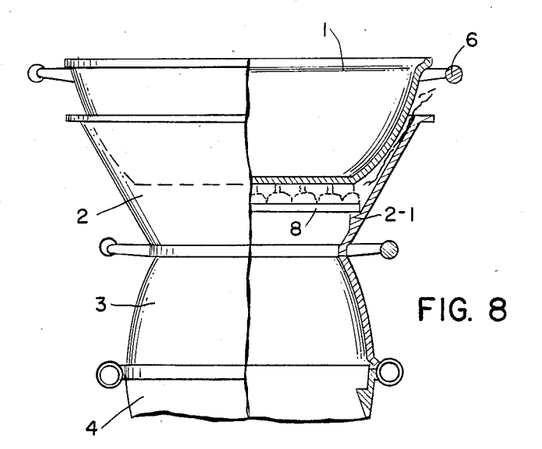
FIG. 8 is an elevational detail, partially in section, of interconnections between the upper and lower sections of the stove body and the grill body, showing a cover used as a wok.

As shown in FIG. 8, when the cover 1 is used as a wok, the cover may be supported directly on briquets with exhaust draft between the spheroidal cover wall and the generally conical grill body wall.

Figures 9, 10, 12:
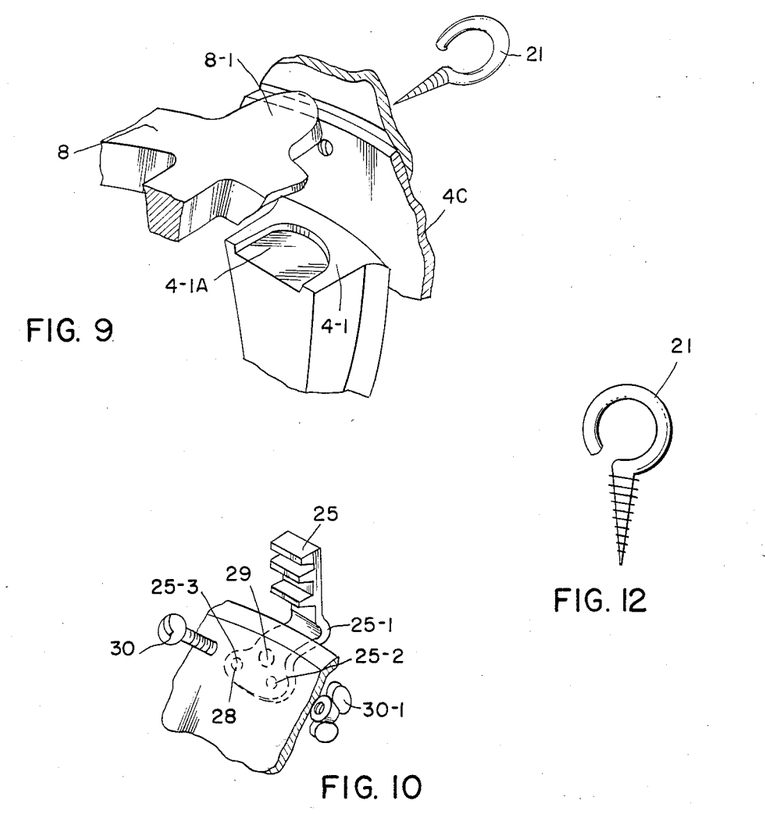
FIG. 9 is a detail of an auxiliary grate support in the lower section of the stove body.
FIG. 10 is a detail of the grill support and ventilation means attached to an upper portion of the stove body.
FIG. 12 is a detail of an interconnection means of the present invention.

As shown in FIG. 9, the grate supports 4-1 are integrally formed in the wall 4C of the lower stove body section. Upward facing recesses 4-1A receive radial lugs 8-1 on grate 8. Fasteners 21 extend through a lower portion of the upper stove body section 3 and an upper portion of the lower stove body section wall 4C to secure the stove body sections in place. The I-bolt 21 is preferably constructed in a conventional looped-end threaded rod 21A, as shown in the detail of FIG. 12.

Preferably, the fasteners extend over the lugs 8-1 of the assembled grate to hold the grate in position when newspaper is stuffed in the lower stove body, when charcoal is added through the upper stove body or when the ashes are removed.

As shown in the detail of FIG. 10, a preferred grill support 25 has a body 25-1 which lies along an upper portion of the grill body. The grill support 25 has openings 25-2 and 25-3 which align with openings 28 in the grill body to receive fasteners 30. Wing nuts 30-1 tighten the supports 25 against the grill body. When a cover is placed on the upper edge of the grill body, wing nuts 30-1 may be loosened to provide exhaust draft through ventilation openings 29 in the grill body with the supports 25 acting as flap means to control the ventilation holes.

Figure 11:
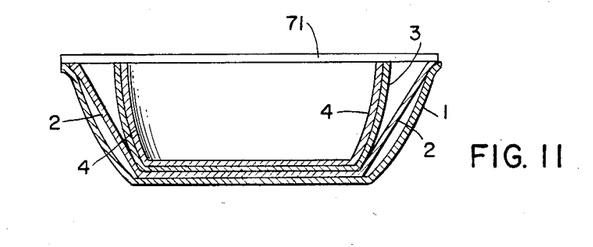
FIG. 11 is a detail of interfitted parts.

As shown in FIG. 11, the grill of the present invention is packed for shipment by telescoping the upper and lower stove body sections 3 and 4 within the grill body 2 and the cover 1. The leg assembly is placed within the cavity of the stove body sections and the fasteners, handles and grate are placed within the stove body cavity, and the grill 71 is placed atop the telescoped members, whereupon the stove is ready for packing and shipment.

Figure 13:
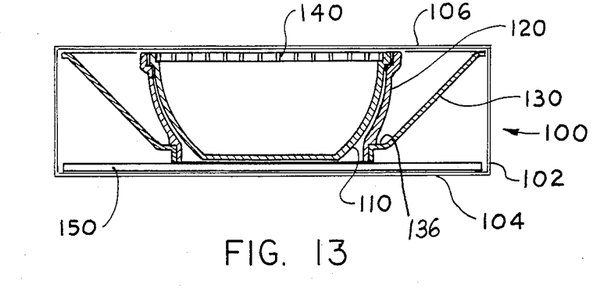
FIG. 13 is a sectional view of a basic stove packed for shipping in a cardboard box.

One preferred form of the stove configured for shipment is packed within the carton 100, as shown in FIG. 13. The pasteboard shipping carton has side walls 102, a bottom wall 104 and a top wall 106, which tightly fit against the components. In that preferred embodiment, the spheroidal stove body lower section 110 is packaged within the inverted stove body upper section 120 which is, in turn, packaged within the grill body 130. Door hardware, individual legs, handles and connectors are packaged within the cavity of the lower stove body section 110. A grate 140 is positioned within the open upper end of the lower stove body section 110. A grill 150 is positioned along the bottom wall 104 of the carton or may be positioned atop the assembled elements. The flat carton is closed, stapled, labeled and ready for packing in a container.

Figure 14:
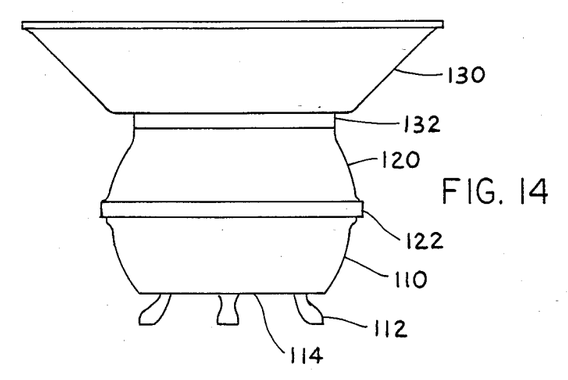
FIG. 14 is an elevation of the stove shown in FIG. 13 in assembled condition.

FIG. 14 shows the stove elements removed from the container and assembled on individual legs 112. In the preferred embodiment of the invention, three legs have flat upper surfaces with triangular depressions in which triangular lugs extending downward from the bottom of the stove fit. Openings through the lugs and depressions receive fasteners which hold the legs on the flat lower surface of the lower section of the stove body.

Figure 15:
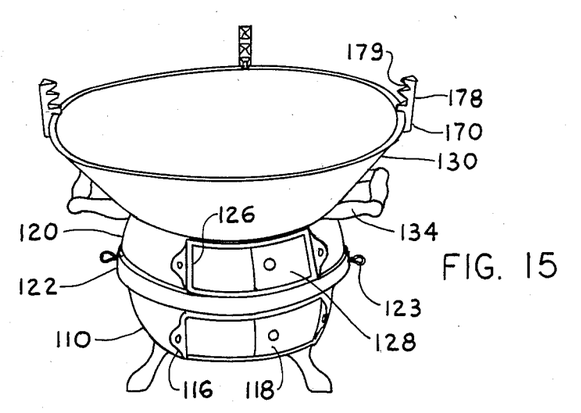
FIG. 15 is a perspective view of a preferred stove shown in FIGS. 13 and 14 with preferred interconnections and attachments.

As shown in FIG. 15, a lower door 118 having a spheroidal surface similar in curvature to the lower stove body is placed against the lower stove body section, and a frame 116 is connected to the body with two threaded fasteners. A rectangular opening extending through the body wall is selectively closed by the sliding door 118, which moves within the frame 116. A similar frame 126 and door 128 are provided in the upper stove body section.

As can be seen in FIG. 13, the lower body section has a circular, horizontally extending shelf at its upper portion for holding the grate 140. An upward extending collar surrounds the shelf. The upper body section 120 has a lower, downward extending flange 122 which fits around the collar of the lower body section 110. I-bolts 123 extend through openings in flange 122 to threaded openings within the upper collar of the lower body section 110. The lower flange 132 of the grill body 130 extends downward over the upper collar of the upper body section 120. Handles 134 are aligned with the flange 132 and fasteners not shown extend through flange 132 into threaded openings within the upper collar of upper body section 120. The fasteners thus hold the handles on the flange 132 and hold the grill body assembled with the upper section of the stove body.

Figure 16:
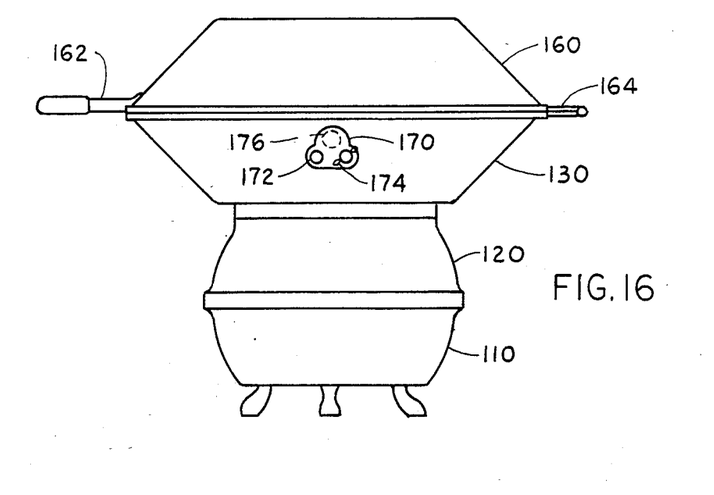
FIG. 16 is an elevational view of the stove shown in FIG. 15 with a wok-cover used in the cover configuration.

As shown in FIG. 16, a cover 160 with handles 162 and 164 fits on top of the grill body.

Figure 17:
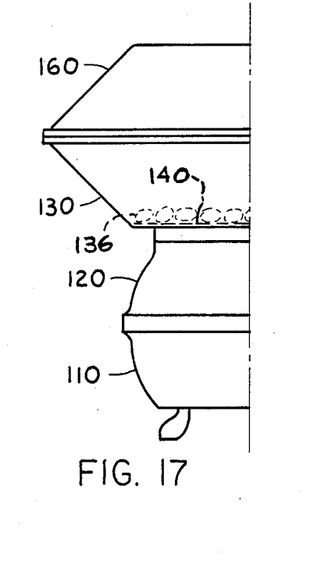
FIG. 17 is a half elevation of a stove of the present invention.

In the usual configuration of the stove, grate 140 rests upon the inner shelf 136 of the stove body 130 as shown in FIG. 17.

As shown in FIG. 16, openings 176 in an upper portion of the grill body 130 are closed by supports 170, which are held against the grill body 130 by fasteners 172. Wing nuts 174 are loosened to permit the elements 170 to fall away from the openings 176 and to provide exhaust venting and draft control.

As shown in FIG. 15 the vent controls 170 have upward extensions 178 with inward extending grooves 179 for holding a grill at varied heights.

Figure 18:
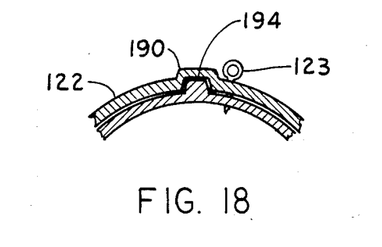
FIGS. 18 and 19 are details of interconnections between the upper and lower sections of the stove body.
Figure 19:
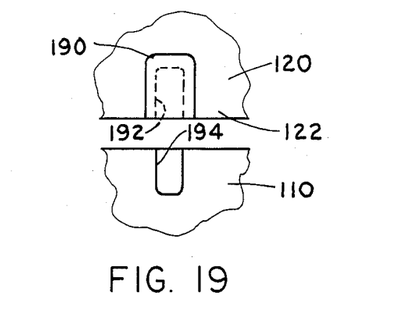

In a preferred embodiment of the invention as shown in FIGS. 18 and 19, the lower stove body section 110 and upper stove body section 120 have cooperating lugs and grooves which assist alignment. A channel 190 is formed outward from flange 122. A lug 194 in the upper portion of lower body section 110 fits within a groove 192 in the channel 190 to align the body portions. I-bolt 123 extends through an opening in flange 122 into a threaded opening in the upper portion of lower body section 110.

The basic embodiment of the grill apparatus has three interfitting sections, all of substantially identical height. The bottom sections form a spheroidal stove body, and the upper section forms a generally larger, conical grill body. A grate may be placed on a shelf in the lower stove body or on a shelf in the grill body. In preferred embodiments, doors in the upper and lower body sections are used to insert and ignite paper which, in turn, ignites briquets on the grate. Either or both doors are used for draft control. A grill may rest atop the grill body or may be supported above the grill body by supports attached to the grill body. A preferred cover doubles as a wok. When the cover is used in its conventional orientation, fasteners holding the grill supports against the grill body are loosened to vent the exhaust and permit and control burning of the briquets. When roasting is finished, fasteners on the grill supports are tightened to close the heat vents, and the doors in the stove body are closed to extinguish the briquets and ready them for reuse. Ashes may be removed by opening the lower door and tilting the stove body. Alternatively, the two I-bolts which connect the upper and lower sections of the stove body may be removed, and the upper body may be removed from the lower body section, and ashes may be dumped from the lower body section. The door opening makes a convenient handle when dumping ashes. Removing four fasteners to disconnect the upper body section from the grill body readies the grill apparatus for compact storage or transportation. When the grill is assembled, the grate is removed, and two crumpled newspaper pages are dropped into the stove body from the top. The grate is replaced, and one layer of briquets is placed on top of the grate. The small upper door is closed, and the larger lower door is opened. A match extended through the lower door opening ignites the newspaper. As soon as the two layers of newspaper burn down, a third crumpled sheet is inserted through the larger lower door. Briquets will then be ignited. If strong heat is needed, a second layer of briquets is placed atop the first layer of briquets after the first layer is well lighted. Two layers of briquets may be required for stirfried cooking. Normal grilling or cooking a pot of stew in the cover requires only one layer of briquets.

After the briquets are fully ignited, the large lower door is closed and the smaller upper door is opened to prevent newspaper ash from blowing upward through the grate toward the grill.

While the invention has been described with reference to specific embodiments, modifications and variations of the invention may be made without departing from the scope of the invention. The scope of the invention is defined in the following claims.

I claim:

1. Compact portable outdoor grill comprising a base body having a lower end and an upper end, means at the upper end of the base body for receiving a grill body, a grill body having an upper end and a lower end and means at the lower end of the grill body for connecting to an upper end of the base body, the base body having lower and upper sections, the lower section of the base body having floor means at a lower end thereof and having an open upper end and means at the upper end of the lower section of the base body for receiving a lower end of the upper section, the lower end of the upper section of the base body having connection means for connecting to the upper end of the lower section of the base body, the upper and lower sections of the base body having telescoping shapes so that, when the upper section of the base body is removed and inverted, one of the base body sections fits within the other base body section and the upper and lower sections and the grill body having substantially identical heights so that the upper and lower sections fit within the grill body in uniform height when in a shipping carton, wherein the grill body has grate receiving means positioned within the grill body and spaced slightly upward from a lower end thereof and further comprising grate means for positioning within the grate receiving means and wherein the lower section of the base body has grate receiving means positioned within an upper end thereof whereby the grate may be interchangeably mounted on the lower section of the base body and on the grill body.

2. The grill apparatus of claim 1 further comprising a cover having an open lower end for attaching to an upper end of the grill body and having a closed upper end, the upper end of the cover being larger than a lower end of the grill body and the cover having a height similar in height of the grill body, whereby the cover may be inverted and placed within the grill body, an inverted upper section and lower section of the base body telescoped for shipping, the upper end of the cover being smaller than an upper end of the grill body whereby the cover may be inverted with its normally upper end placed in the grill body for cooking food within the inverted cover.

3. Compact portable outdoor grill comprising a base body having a lower end and an upper end, means at the upper end of the base body for receiving a grill body, a grill body having an upper end and a lower end and means at the lower end of the grill body for connecting to an upper end of the base body, the base body having lower and upper sections, the lower section of the base body having floor means at a lower end thereof and having an open upper end and means at the upper end of the lower section of the base body for receiving a lower end of the upper section, the lower end of the upper section of the base body having connection means for connecting to the upper end of the lower section of the base body, the upper and lower sections of the base body having telescoping shapes so that, when the upper section of the base body is removed and inverted, one of the base body sections fits within the other base body section and the upper and lower sections and the grill body having substantially identical heights so that the upper and lower sections fit within the grill body in uniform height when in a shipping carton, said grill body further comprising grate receiving means positioned within the grill body and spaced slightly upward from a lower end thereof and further comprising grate means for positioning within the grate receiving means, a cover having an open lower end for attaching to an upper end of the grill body and having a closed upper end, the upper end of the cover being larger than a lower end of the grill body and the cover having a height similar in height of the grill body, whereby the cover may be inverted with the grill body, an inverted upper section and lower section of the base body telescoped for shipping, the upper end of the cover being smaller than an upper end of the grill body whereby the cover may be inverted with its normally upper end placed in the grill body for cooking food within the inverted cover.

4. Compact portable outdoor grill comprising a base body having a lower end and an upper end, means at the upper end of the base body for receiving a grill body, a grill body having an upper end and a lower end and means at the lower end of the grill body for connecting to an upper end of the base body, the base body having lower and upper sections, the lower section of the base body having floor means at a lower end thereof and having an open upper end and means at the upper end of the lower section of the base body for receiving a lower end of the upper section, the lower end of the upper section of the base body having connection means for connecting to the upper end of the lower section of the base body, the upper and lower sections of the base body having telescoping shapes so that, when the upper section of the base body is removed and inverted, one of the base body sections fits within the other base body section and the upper and lower sections and the grill body having substantially identical heights so that the upper and lower sections fit within the grill body in uniform height when in a shipping carton, ventilation openings in a wall of the grill body, vent controls associated with the ventilation openings for selectively opening and closing the ventilation openings and connecting means connected to the vent controls and to the wall for selectively drawing the vent controls against the wall and closing the ventilation openings with the vent controls and selectively permitting the vent controls to move away from the wall to open the ventilation openings, the connection means comprises holes extending through the wall of the body and through the vent controls and threaded fasteners extending through the holes and turnable means connected to the fastener means for tightening the fastener means and drawing the flap against the body and against the ventilation opening, the vent controls connected to the grill body further comprises extensions extending outward and upward from the vent controls, the extensions having upper portions with plural inward extending grooves for selectively receiving a grill in varied positions above the grill body whereby, when the upper ventilation openings are closed by the vent controls by the fasteners drawing the vent controls tight against the grill body, the upward extensions may be used to selectively position a grill above the grill body.

* * * * *